United States Patent [19]

Sakaguchi et al.

[11] Patent Number: 4,783,020

[45] Date of Patent: Nov. 8, 1988

[54] MAGNETIC TAPE WINDING DEVICE USING MAGNETIC EDGE ALIGNMENT

[75] Inventors: Masaaki Sakaguchi; Kazuo Kubota, both of Odawara, Japan

[73] Assignee: Fuji Photo Film Co., Ltd., Kanagawa, Japan

[21] Appl. No.: 55,971

[22] Filed: Jun. 1, 1987

[30] Foreign Application Priority Data

May 30, 1986 [JP] Japan .................. 61-123808

[51] Int. Cl.$^4$ ............................................ B65H 18/00
[52] U.S. Cl. .................. 242/76; 242/67.1 R; 226/93
[58] Field of Search ............ 242/67.1 R, 76, 78, 242/78.1, 179, 186; 226/93-97; 360/66

[56] References Cited

U.S. PATENT DOCUMENTS 4,512,527 4/1985 Rehklav et al. .................. 242/56 R

FOREIGN PATENT DOCUMENTS 51642 3/1986 Japan .

Primary Examiner—Stuart S. Levy
Assistant Examiner—DuBois Steven M.
Attorney, Agent, or Firm—Sughrue, Mion, Zinn, Macpeak, and Seas

[57] ABSTRACT

A tape winding device for magnetically aligning the edge of a magnet tape. A permanent magnet is disposed on a side of a take-up reel opposite the side of a drive shaft rotating the take-up reel. The magnet extends over the diameter of the wound tape.

9 Claims, 5 Drawing Sheets

MAGNETIC TAPE WINDING DEVICE USING MAGNETIC EDGE ALIGNMENT

BACKGROUND OF THE INVENTION

1. Field of the Invention

This invention relates to a magnetic tape winding device which is used in the case where a predetermined length of a magnetic tape is wound on a small tape reel from magnetic tape roll stock, or in the case where the magnetic tape wound on a tape reel is rewound on another tape reel, or in the case where a magnetic tape is wound to form a magnetic tape roll stock, or in the case where a magnetic tape roll stock wider than a magnetic tape product is cut into a plurality of magnetic tape roll stocks different in tape width, and the magnetic tapes of the roll stocks thus obtained are wound on the tape reels.

2. Background of the Invention

The manufacture of magnetic tapes such as audio cassette tapes, video cassette tapes, memory tapes and broadcasting video tapes include intermediate manufacturing steps such as a step of winding a predetermined length of a magnetic tape onto a tape winding structure such as a tape reel or hub from a magnetic tape roll stock, a step in which a magnetic tape wound on a tape winding structure is rewound on another tape winding structure, a step of winding a magnetic tape to form a magnetic tape roll stock, and a step in which a magnetic tape roll stock wider than a magnetic tape product is cut into a plurality of magnetic tape roll stocks different in tape width, and the magnetic tapes of the roll stocks thus obtained are wound on the tape winding structures.

When the magnetic tape is wound on the tape winding structure in the tape winding step or in the tape rewinding step, depending on the properties of the magnetic tape roll stock on the tape delivery side, or the properties of the tape winding structure on the tape winding side, or the properties of the magnetic tape itself, the magnetic tape is vibrated in the direction of its thickness or width. That is, the so-called "tape behavior" varies, as a result of which the magnetic tape wound on the tape winding structure has an unsatisfactory appearance. That is, the winding surface (formed by the tape edges) of the magnetic tape wound on the tape winding structure is uneven as viewed in the axial direction of the tape winding structure. This tendency is significant when the tape winding speed is high.

If the magnetic tape thus unneatly wound is placed, for instance, in a magnetic tape cassette case, the resultant magnetic tape cassette is low both in appearance and in quality. Furthermore, the magnetic tape is liable to curl or its edge is liable to be damaged, with the results that various troubles are induced or the electro-magnetic conversion characteristic is lowered. The above-described difficulty that a magnetic tape is unneatly wound is a serious problem, for instance, for video magnetic tape for high density recording operation, because audio signals and synchronizing signals rerecorded along the tape edge.

Therefore, in a conventional magnetic tape manufacturing operation, after the above-described magnetic tape winding or rewinding step, the external appearance of each roll of magnetic tape is, for instance, visually inspected to determine whether or not, in each of the magnetic tape rolls, the tape has been neatly wound on the tape winding structure. The time and cost required for the visual inspection greatly lower the efficiency of manufacturing the magnetic tape efficiency.

In the operation of winding a magnetic tape which is liable to be unneatly wound, in order to reduce the burden of the visual inspection or to improve the external appearance of the magnetic tape roll, a so-called "dress winding method" as shown in FIG. 1 or 2 has been employed in the art.

FIGS. 1 and 2 are perspective views outlining the arrangement of a tape winding structure 2 and its relevant components on the tape winding side. In the case of FIG. 1 a flexible endless belt 11 of rubber or polymide rotatably is held by rollers 12, 13 and 14. The flexible belt 11 is turned together with a magnetic tape T while elastically strongly pushing the tape's magnetic surface radially inwardly of the tape winding structure 2 so that the magnetic tape T is neatly wound on the tape winding structure. In the case of FIG. 2, a belt 15 of relatively soft unwoven cloth is provided between one of the flanges of a tape winding structure 2 and the winding surface (formed by the tape edges) of a magnetic tape T. The belt 15 is first wound on the belt forwarding side. While the belt 15 thus wound is supported by rollers 17 and is being rewound on the belt winding side 18 at a predetermined low speed, the magnetic tape T is thereby pushed axially inwardly of the tape winding structure 2 so that the magnetic tape is neatly wound on the tape winding structure 2.

In each of the methods shown in FIGS. 1 and 2, the belt 11 and 15 directly touches the magnetic tape T. Therefore, the methods suffer from difficulties that the magnetic layer is scraped or fibers come off the unwoven cloth, thus resulting in the occurrence of dropouts, or the magnetic tape is pushed so greatly that the tape edge or the tape itself is damaged. That is, the methods cannot be employed as the case may be. Furthermore, the above-decribed dress winding mechanism greatly consumes itself, thus providing another difficulty that the maintenance cost is increased. In addition, the dress winding mechanism is disadvantageous in the following points. The magnetic tape winding device must be so designed that, in replacing the tape winding structure 2, the dress winding mechanism can be moved from the operating position to the standby position and vice versa. That is, the device becomes correspondingly intricate in construction. Furthermore, in such a magnetic tape winding device, the replacement of the tape winding structure takes a relatively long time, and the time required for the movement of the dress winding mechanism obstructs improvement of the productivity.

Two cassette tape winding systems have been employed in the art. One of the two systems is a so-called "open winding system" in which a magnetic tape wound by the aforementioned dress winding method is inserted in a cassette case, to form a magnetic tape cassette. The other is a so-called "in-cassette winding system, or C-O winding system, or V-O winding system" in which a magnetic tape is wound in the final step of the cassette assembling work.

The latter system will be described with reference to FIGS. 3 and 4. All components except for a magnetic tape are built in a cassette case 8. More specifically, a tape winding structure on the tape delivery side and another tape winding structure on the tape winding side are connected through a leader tape 10 to each other. The so connected tape winding structures are inserted into the cassette case 8, and the cassette case 8 is tightened with screws, thus providing a semi-finished product of a magnetic tape cassette (generally referred to as "V-O" or "C-O"). With a tape winding device called "in-cassette winder", the leader tape 10 is pulled out of the semifinished product and cut into two parts. The end of one of the leader tapes is spliced to the end of the magnetic tape to be wound. The other leader is kept held with a holding member 10a which, for instance, sucks and retains a magnetic tape. The tape winding structure 2 connected to the leader tape of which the magnetic tape T has been fastened is turned until a predetermined length of the magnetic tape is wound on it and the magnetic tape is then cut. The end of the magnetic tape thus cut is spliced to the end of the other leader tape fastened to the other tape winding structure 3. Thus, the magnetic tape cassette has been manufactured. In this in-cassette winding system, unlike the above-described method, it is impossible to mechanically touch the magnetic tape at a part of the tape winding structure. Accordingly whether or not the magnetic tape wound is acceptable in external appearance depends on the properties of the magnetic tape and the accuracy of the cassette components. That is, it is completely impossible to control the winding operation to thereby precisely wind the magnetic tape on the tape winding structure. In order to precisely wind the magnetic tape on the tape winding structure, a method has been employed in which, as shown in FIG. 4, a roller 50 having flanges 51 at both ends is arranged at the inlet of the cassette so that a force is exerted on the magnetic tape which is being wound in its widthwise direction. That is, the magnetic tape is pushed towards its one flange. If, in this method, a strong force is applied to the magnetic tape, it may damage the tape edge. On the other hand, application of a weak force thereto cannot make the magnetic tape acceptable in appearance when wound. That is, the method still has a problem to be solved.

Recently, a magnetic tape winding device as shown in FIG. 5 has been proposed in the art (cf. Japanese Patent Application (OPI) No. 51642/1986 (the term "OPI" as used herein means "an unexamined published application"). In the device, a winding drive shaft 30 is detachably engaged with the winding hub 41 of a winding reel 40 which is made up of the winding hub 41 and a single flange 42. At least one magnet 31 is mounted on the winding drive shaft 30 in such a manner that the magnet is located on one side of the flange 42 which is opposite to the other side where a magnetic tape T is wound, so that the magnetic tape T is wound on the winding reel 40.

However, the magnet 31 disposed around the shaft 30 as shown in FIG. 5 provides the following problems. In a magnetic tape roll wound on the winding reel 40, its central portion close to the winding core 41 is lower in neatness than its peripheral portion. This difficulty is based on the following reason. The configuration of the magnet 31 depends on that of the drive shaft 30. That is, the magnet 31 is, for instance, in the form of a ring (having a central hole) so that it can be mounted on the shaft. Therefore, the lines of magnetic force are not regular in direction near the center of the winding reel 40, and the magnetic flux density is smaller. Accordingly, the force attracting the magnetic tape towards the flange 42 of the winding reel 40 is unstable and weak during the initial period of the magnetic tape winding operation.

Since the magnet 31 is placed below the flange, its installation space is limited. Furthermore, the magnet 31 is limited in diameter and configuration by a drive system such as the winding drive shaft. Accordingly, the manufacture of the magnet is rather difficult. That is, the magnet is high in manufacturing cost, with the result that the maintenance cost of the device is high.

SUMMARY OF THE INVENTION

In view of the foregoing, an object of this invention is to provide a magnetic tape winding device which can neatly wind even a magnetic tape which is not uniform is property.

Another object of the invention is to provide a magnetic tape winding device which eliminates the above-described difficulties that a conventional magnetic tape winding device employing the above-described dress winding system in which the magnetic tape is mechanically touched is unavoidably intricate in construction and that the magnetic tape wound is lowered in quality by secondary effects as described above. Also, the magnetic tape winding efficiency should be increased.

A further object of the invention is to provide a magnetic tape winding device with which, even in the incassette winding system for which no means for winding a magnetic tape neatly has heretofore been provided, a magnetic tape can be wound neatly, and even a magnetic tape large in width which is used to provide magnetic tape roll stocks can be wound neatly.

The foregoing objects of the invention have been achieved by the provision of a magnetic tape winding device in which a tape winding structure is rotated to wind a magnetic tape on it. According to the invention, a magnet for attracting a magnetic tape is provided in such a manner as to confront the end of a winding drive shaft adapted to rotate the tape winding structure.

DETAILED DESCRIPTION OF THE PREFERRED EMBODIMENTS

One embodiment of this invention will be described in detail.

Figure 1:
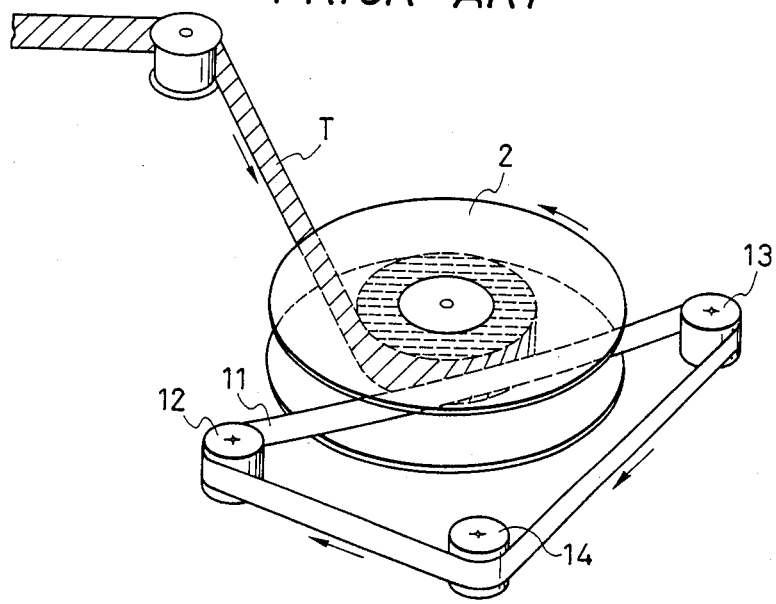
FIGS. 1 and 2 are perspective views showing part of a conventional magnetic tape winding device.
Figure 2:
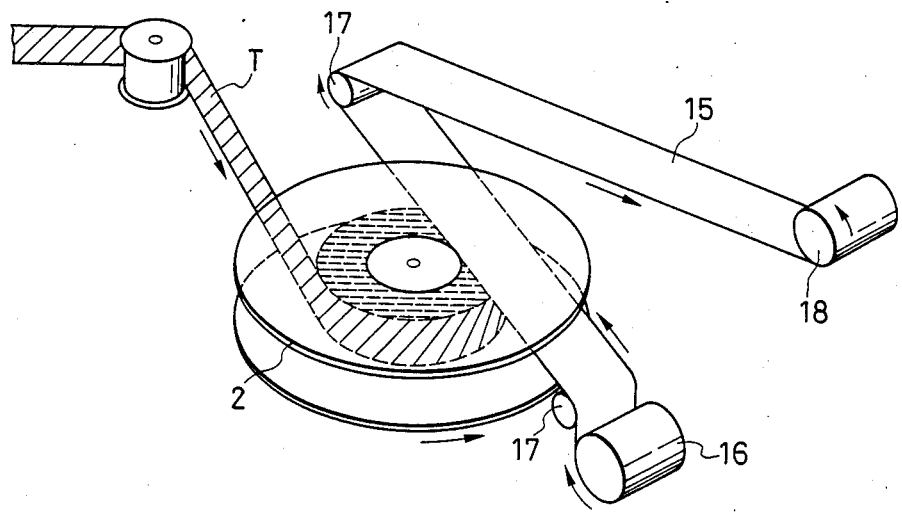
Figure 3:
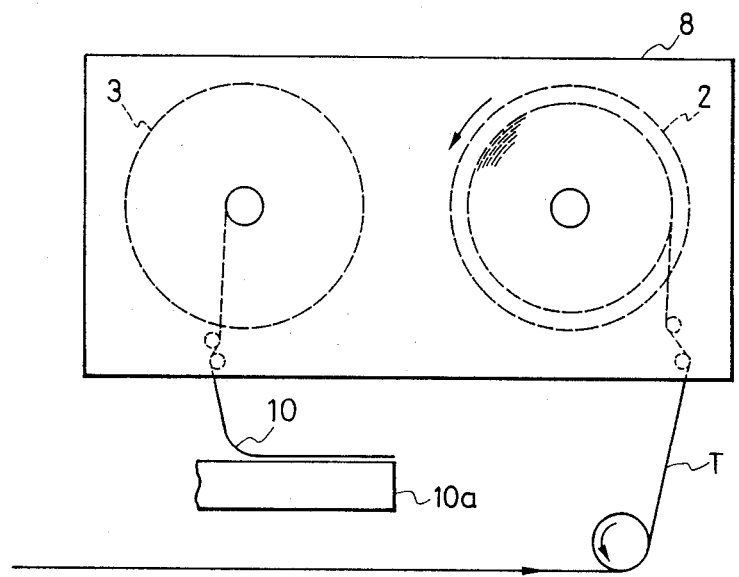
FIG. 3 is a plan view outlining a conventional incassette winding type magnetic tape winding device.
Figure 4:
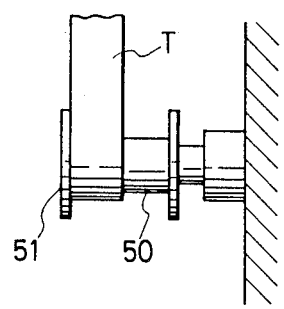
FIG. 4 is an enlarged side view showing a part of FIG. 3.
Figure 5:
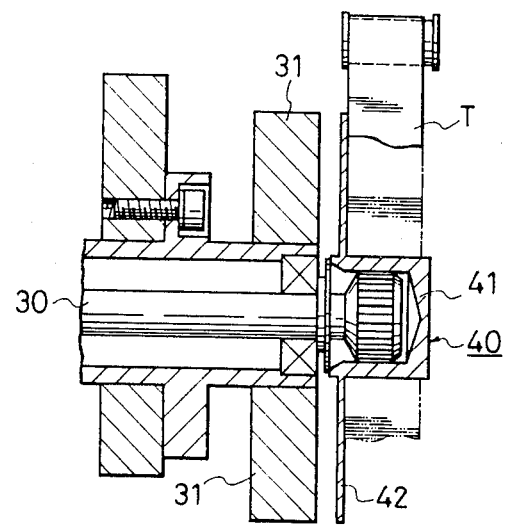
FIG. 5 is a sectional view showing a part of the conventional device.
Figure 6:
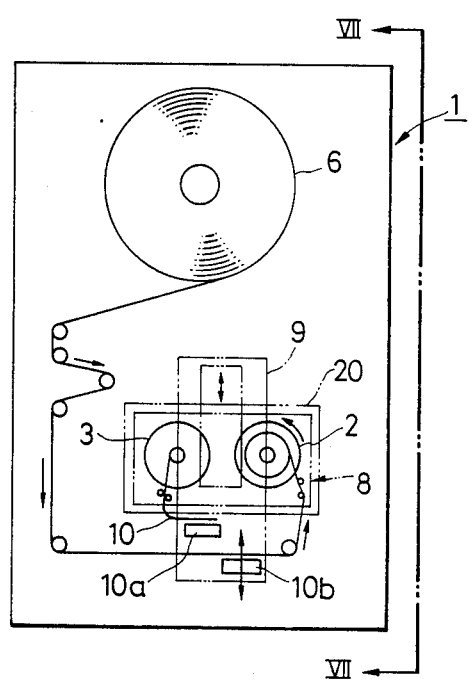
FIGS. 6 and 7 are a front view and a side view, respectively, outlining the arrangement of one example of a magnetic tape winding device according to this invention.
Figure 7:
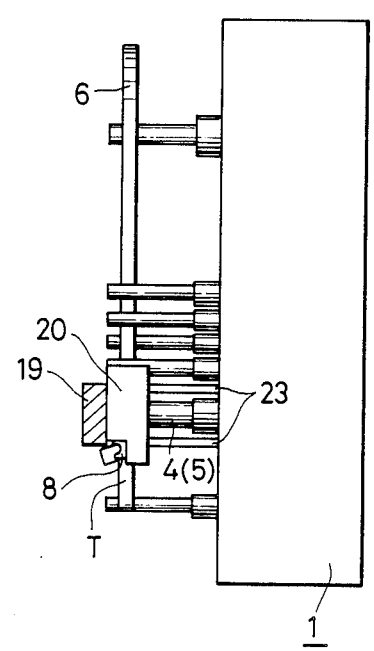

FIG. 6 is a front view outlining the arrangement of one example of a magnetic tape winding device of incassette winding type, and FIG. 7 is a side view of the device as viewed in the direction of sectional line VII—VII in FIG. 6. The device is used to wind a magnetic tape T on a pair of tape winding structures 2 and 3 (hereinafter referred to as "tape reels", when applicable) which have been fabricated in advance in a video tape cassette case of a VHS or Beta system to thereby provide a video tape cassette as a product.

The operation of the magnetic tape winding device 1 will be briefly described.

Figure 8:
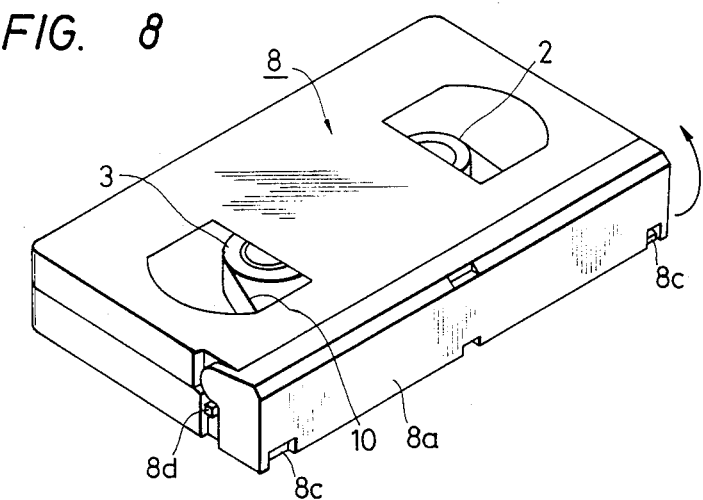
FIG. 8 is a perspective view of a cassette case according to the VHS system.
Figure 9:
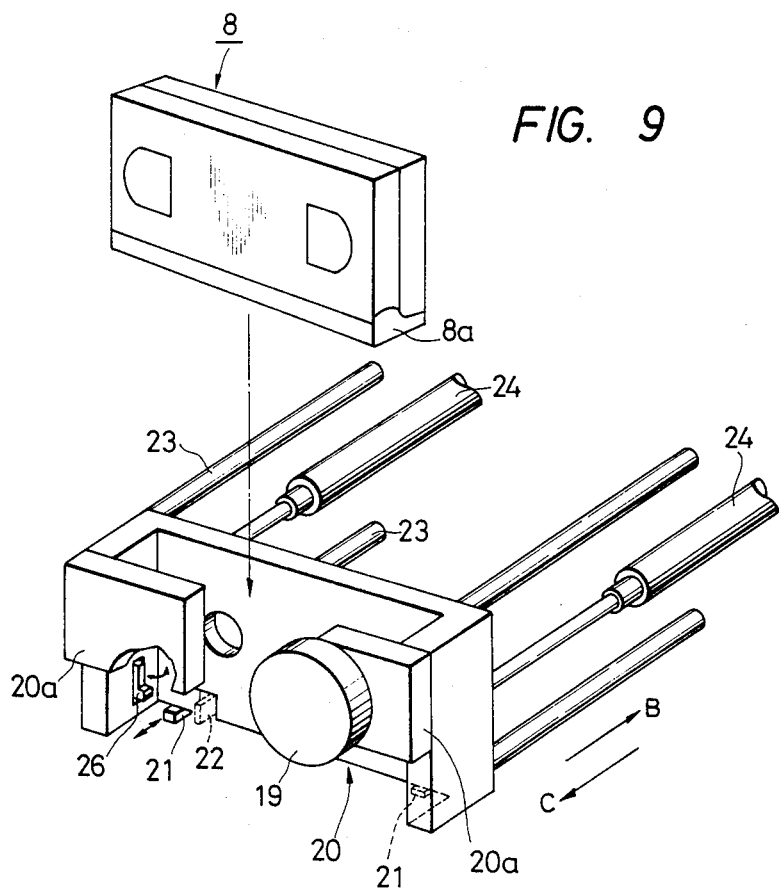
FIG. 9 is a perspective view for a description of the structure and operation of a cassette holder.

For instance, a cassette case 8 of VHS system as shown in FIG. 8, in which tape reels 2 and 3 coupled through a leader tape 10 having a predetermined length have been fabricated, is inserted in a cassette holder 20 of the device 1 from above. The cassette holder 20 is substantially equal in structure to the cassette case holding bucket of a magnetic tape recording and reproducing device. However, it should be noted that the cassette holder 20 is so designed that the cassette case 8 can be removed therefrom by moving it downwardly. As shown in FIG. 9, the cassette case 8 inserted into the holder 20 from above is held in the holder 20 by locking members 21 provided on the lower edge of the holder. More specifically, the locking members 21 are positioned in correspondence to cuts 8c, as shown in FIG. 8, formed in the lower edge portion of a guard panel 8a which is adapted to open and close the opening formed in the front wall of the cassette case 8. Therefore, the provision of the locking members 21 will not obstruct the operation of the guard panel 8a of the cassette case 8. The guard panel 8a is normally locked by a locking member 8d built in but partially protruding out of the cassette case 8. However, when the cassette case 8 is inserted into the cassette holder 20, the locking member 8d is pushed inwardly of the cassette case 8 by a releasing lever 26 which is provided on a side wall of the holder 20 in such a manner that it is elastically urged towards the cassette case, so that the guard panel 8a is released. That is, it can be opened.

Thereafter, the cassette holder 20 supported with four slide shafts 23 is moved, as shown in FIG. 9, towards a front panel 1a of the tape winding device 1 (or in the direction of the arrow B) for instance by two air cylinders 24. As a result, as shown in FIG. 9, drive shafts 4 and 5 are inserted into and engaged with the tape reels 2 and 3. As the cassette holder 20 is moved in the direction of the arrow B, the guard panel 8a is swung upwardly by a guard panel opening lever 22 secured to the front panel 1a, so that the leader tape 10 fastened to the tape reels 2 and 3 appears in the front opening of the cassette case 8.

Under this condition, the leader tape 10 is cut into two substantially equal parts. The end of the leader tape 10 of the take-up tape reel 2 is spliced to the end of the magnetic tape T fed from a magnetic tape roll stock 6 by using a splicing tape or the like. After being would a predetermined length on the take-up tape reel 2, the magnetic tape T is cut, and the end of the magnetic tape thus cut is fastened to the end of the leader tape 10 of the tape reel 3.

The operations of cutting the leader tape 10 and the magnetic tape T and of splicing the leader tape 10 and the magnetic tape T are carried out with cutting and splicing means 9 which has tape end holding members 10a and 10b, a cutter and a splicing tape. The magnetic tape T supplied from the magnetic tape roll stock 6 is wound on the take-up tape reel 2 while being conveyed along a path including guide pins and guide rolls.

After the leader tape 10 of the tape reel 3, which has been joined to the magnetic tape T, is wound on the tape reel 3, the cassette holder 20 is moved in the direction of the arrow C (opposite to the direction of the arrow B) by the air cylinders 24. As the cassette holder 20 is moved in this manner, the tape reels 2 and 3 are disengaged from the drive shafts 4 and 5, and the guard panel 8a closes the front opening of the cassette case 8. Thereafter, the locking members 21 holding the cassette case 8 are retracted by moving means such as a solenoid, so that the cassette case 8 is removed downwardly from the holder 20.

Figure 10:
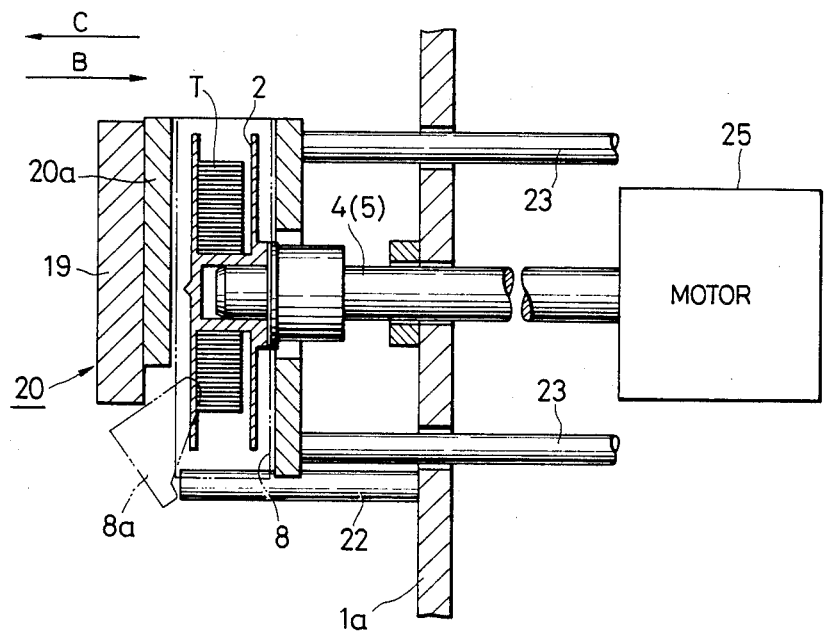
FIG. 10 is an enlarged sectional view showing essential components in FIG. 7.

For clarification in illustration, the cutting and splicing means 9 is not shown in FIGS. 7, 9 and 10.

Figure 11:
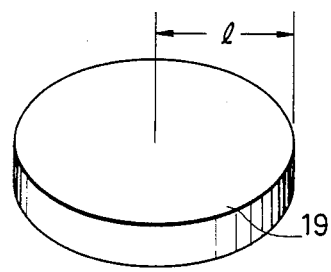
FIG. 11 is an enlarged perspective view of a magnet shown in FIGS. 7.

The arrangement described so far is similar to that of the conventional device. However, it should be noted that the specific feature of the invention resides in the cassette case mounting means. That is, a permanent magnet 19 is provided on the side of the tape reel 2 on which the magnetic tape T is wound. More specifically, the permanent magnet 19 is so positioned as to confront with the end of the drive shaft 4 which is coupled to drive means such as a motor 25. The permanent magnet 19 is for instance in the form of a disc as shown in FIG. 11, both sides of which are the opposite magnetic poles. The diameter of the permanent magnet 19 should be substantially equal to that of the magnetic tape wound on the tape reel. In this case, the magnetic field is substantially in the widthwise direction of the magnetic tape T (or in the axial direction of the drive shaft 4). However, the direction of the magnetic field is not limited in the invention.

The cassette holder 20 is substantially in the form of a book case whose upper and lower sides are open. The permanent magnet 19 is attached to an upper supporting board 20a of the cassette holder 20. The air cylinders 24 are not shown in FIGS. 7 and 10.

In winding the magnetic tape T with the magnetic tape winding device thus constructed, the magnetic tape T is wound while being deflected towards the upper flange of the tape reel because it is attracted by the permanent magnet 19 (cf FIG. 10). Since the permanent magnet 19 is in the form of a disc (not a ring), the direction of the magnetic field and the density of magnetic flux are stable even at the central portion of the permanent magnet 19 and the magnetic force can be positively exerted on the magnetic tape T. Accordingly, the magnetic force acts stably on the magnetic tape T throughout the magnetic tape winding operation. Therefore, the magnetic tape is wound precisely and tightly with the tape edges aligned. Even the top portion of the magnetic tape which is unstable in behavior being firstly wound can be finely wound because the magnetic force acts positively on it as was described above.

The value of the magnetic force of the permanent magnet 19 is not particularly limited, but should be determined according to various conditions such as the tension of the magnetic tape during the winding operation, the kind of the magnetic tape, the distance between the magnet 19 and the magnetic tape, the tape winding speed, and the effect of the magnetic field on the magnetic tape T.

In the above-described embodiment, the material of the cassette holder 20 is not specified. However, in the invention, the upper supporting board 20a of the cassette holder 20 may be made of a ferromagnetic material, for instance an alloy of cobalt, nickel, iron and manganese. this is equivalent to the case where a magnet is set close to the magnetic tape T. In this case, the magnetic field acting on the magnetic tape T becomes stable in directivity, and the magnetic force is substantially increased. The use of ferromagnetic supports in disclosed in commonly assigned Japanese Patent Application 124959/86.

In the above-described embodiment, the permanent magnet 19 is fixedly positioned. However, the invention is not limited thereto or thereby. For instance, the device may be so designed that the permanent magnet 19 is moved along the axis of the drive shaft 4 to vary the magnetic force acting on the magnetic tape. Furthermore in the above-described embodiment, the permanent magnet 19 is in the form of a disc whose diameter (l) is equal to or larger than the diameter of the flanges of the tape reel 2 as was described above. However, the invention is not limited thereto or thereby. For instance, the permanent magnet 19 may be rectangular if it is large enough to apply a magnetic force which is constant in directivity over the winding width of a magnetic tape to be wound, in a part of the tape reel 2. That is, the magnet is not particularly limited in configuration.

Furthermore in the above-described embodiment, the permanent magnet 19 is attached to the cassette holder 20. All or part of the upper supporting board 20a of the cassette holder 20 may be a permanent magnet. That is, a part of the tape reel 2 which confronts with the tape reel 2 may be permanent magnet. This method can eliminate the problem that the magnetic tape winding device is made intricate in structure and large in size.

In the above-described magnetic tape winding device 1, the position of the permanent magnet is limited. That is, it is so positioned as to confront with the drive shaft 4; however, the invention is not limited thereto or thereby. For instance, the magnet may be provided at a position in the magnetic tape running path so that the magnetic force acts on the magnetic tape in the widthwise direction whereby the oscillation of the magnetic tape T in the widthwise direction is suppressed and the magnetic tape is run stably.

In the above-described embodiment and modifications, the permanent magnet is employed. However, the invention is not limited thereto or thereby. That is instead of the permanent magnet, an electromagnet can be used. In this case, the magnetic force of the electromagnet can be freely changed with the current flowing in the electromagnet.

The concept of the term "magnet" as used herein is not limited only to the above-described permanent magnet or electromagnet with a core. That is, it is intended to means a magnetic field generating means including a coil-shaped electromagnet without a core.

This invention is not limited to the above-described embodiment or modifications. As was described in the introductory part of the specification, the technical concept of the invention is applicable to the case where a magnetic tape roll stock wider than magnetic tape products are cut into a plurality of magnetic tape roll stocks different in tape width, and the magnetic tapes of the roll stocks thus obtained are wound. Furthermore, it goes without saying that the technical concept of the invention is applicable not only to the magnetic tape winding device of the in-cassette winding type described above, but also to a magnetic tape winding device of the open-reel winding type. In the latter case, it goes without saying that it is necessary to provide a supporting member which holds the magnet in such a manner that the magnet confronts with the end of the winding drive shaft. However, the supporting member should be so designed that, for instance, it is movable between the operating position and the standby position so that the tape reel can be freely mounted and demounted.

As was described above, in the magnetic tape winding device according to the invention, the magnet for attracting the magnetic tape is so disposed as to confront with the end of the drive shaft adapted to rotate the tape reel. Because of this arrangement, the magnet is not limited in configuration and size by other components (such as for instance the drive shafts, and the magnetic force is positively exerted on the core or central portion) of the tape reel to align the tape edges during the tape winding operation. Especially, with the device of the invention, unlike the conventional one with the magnet around the winding drive shaft, the top end portion of the magnetic tape which is unstable in behavior can be precisely wound on the tape reel. That is, the magnetic tape wound on the tape reel is fine in appearance near the core.

Thus, according to the invention, in winding a magnetic tape, the tape edges are not damaged and the magnetic surface is not damaged. That is, a magnetic tape can be wound with the tape edges aligned. Furthermore, the magnetic tape winding efficiency is improved according to the invention. Especially, the magnetic tape winding device of in-cassette winding type can be markedly improved in operation according to the invention. Furthermore, in the device of the invention, the magnet is not disposed in a relatively narrow place such as that around the winding drive shaft. This arrangement contributes to the provision of the magnetic tape winding device which is simple in construction and in maintenance.

What is claimed is:

1. A magnetic tape winding device, comprising:
a tape winding structure having a hub to which a magnetic tape is attachable;
means for rotating said tape winding structure, whereby said magnetic tape is wound on said hub, said rotating means including a drive shaft insertable into said hub from a first side of said hub; and
magnetic means disposed on a second side of said tape winding body opposite said rotating means and confronting an end of said drive shaft for exerting a magnetic force on said wound tape substantially along an axial direction of said drive shaft.

2. A magnetic tape winding device as recited in claim 1, wherein said magnetic means comprises a permanent magnet.

3. A magnetic tape winding device as recited in claim 2, wherein said magnetic means further comprises a ferromagnetic layer between said permanent magnet and said tape winding structure.

4. A magnetic tape winding device as recited in claim 1, wherein said magnetic means consists of a planar continuous permanent magnet magnetized along said axial direction of said drive shaft.

5. A magnetic tape winding device as recited in claim 4, wherein said planar magnet extends over an area including all of an area of said wound tape.

6. A magnetic tape winding device as recited in claim 1, wherein said tape winding structure is a first tape winding structure and further comprising a cassette holder for holding a cassette containing said first tape winding structure and a second tape winding structure and for supporting said magnetic means.

7. A magnetic tape winding device as recited in claim 6, wherein said magnetic means comprises a permanent magnet.

8. A magnetic tape winding device as recited in claim 7, wherein said cassette holder comprises a ferromagnetic material supporting said magnet and interposed between said magnet and said first tape winding structure.

9. A magnetic tape winding device as recited in claim 6, further comprising means for moving said cassette holder along said axial direction of said drive shaft to engage and disengage said drive shaft with said hub.

* * * * *